United States Patent [19]

Yun-Shang

[11] Patent Number: 4,956,580

[45] Date of Patent: Sep. 11, 1990

[54] AUTOMATIC CAR LAMPS LIGHTING CONTROLLER

[76] Inventor: Wang Yun-Shang, No. 4, Lane 34, An Jiu Street, Taipei, Taiwan

[21] Appl. No.: 215,640

[22] Filed: Jul. 6, 1988

[51] Int. Cl.[5] ............................................. B60Q 1/26
[52] U.S. Cl. ........................................ 315/83; 315/77; 315/82
[58] Field of Search ............................ 315/82, 83, 77; 307/10.6

[56] References Cited

U.S. PATENT DOCUMENTS

| | | | |
|---|---|---|---|
| 2,917,665 | 12/1959 | Carpenter et al. | 315/83 |
| 3,037,144 | 5/1962 | Mantia | 315/82 |
| 3,088,051 | 4/1963 | Scanlon | 315/77 |
| 3,201,643 | 8/1965 | Hanano | 315/83 |
| 3,349,281 | 10/1967 | Collins | 315/83 |
| 3,389,296 | 6/1968 | Carruth | 315/77 |
| 3,473,083 | 10/1969 | Guida | 315/82 |

Primary Examiner—Eugene R. LaRoche
Attorney, Agent, or Firm—Asian Pacific Int'l Patent & Trademark Office

[57] ABSTRACT

An automatic car lamps lighting controller to provide warning light in the daytime as well as in the night. The system includes an induction coil for detecting the start up of the car engine, an amplifier circuit, a comparator, control relays, and a night control circuit. As soon as the car is started, the front and the rear location lamp of the car being automatically turned on; the car front lamps and dash lamps automatically turned on in the night. The system enables the instant vehicle (car) to be readily seen by the drivers of other vehicles even though the driver of the instant vehicle neglects or refuses to manually turn on the road illumination lamps or vehicle location (parking) lamps.

3 Claims, 4 Drawing Sheets

AUTOMATIC CAR LAMPS LIGHTING CONTROLLER

BACKGROUND OF THE INVENTION

The car has become one of requisite transportation vehicles in the modern time to meet people's requirements for traveling. Consequently, traffic accidents are increasing each day. Therefore, traffic regulations and rules are set for drivers to commonly abide by to improve safety conditions.

Due to various customs of the people and different climate, each country has its own traffic regulations and rules. For instance, in some nations, it is imperative to turn on car location lamps whenever driving on the road, no matter day or night, to let other car drivers be recognized. When there is poor visibility and poor weather such as fogging or snowing, this traffic rule is particularly important. The reason to set such a rule is because the front lamps of a car are not only for illuminating in the night but also for warning other drivers. For example, during driving on a snowy road, reflection of frost and snow may cause snow blindness and illusion, and traffic accidents may thus happen, and more particularly, if the car coming from the opposite direction does not have alarm lamps. Further, it is dangerous to drive in heavy fog without the provision of proper lighting.

The above said traffic rule for safe driving is indeed based on a good purpose. However, due to personal habit or temporary negligence or error, the drivers may violate the rule to thus endanger the drivers' life and cause meaningless losses.

In view of the above mentioned problems and in order to meet future requirements in all nations, the present automatic car lamp lighting controller is created to turn on the front and rear car lamps a short period after initial movement of a car and to automatically turn on dash lamp and head-lamp lower beam in the night so as to increase driver safety.

Currently, according to the traffic regulations in Sweden and Canada, it is required to turn on car lamps even driving the daytime. Apparently, this regulation will soon be accepted by the people and transportation authorities in every country in the very near future.

SUMMARY OF THE INVENTION

The main object of the present invention is to arrange an induction coil around the cable of a car spark plug for transmitting an ignition signal to the car lamps lighting controller so as to let the car location lamps be tuned on whenever the car is being driven.

Another object of the present invention is to provide a photoresistance that senses ambient light levels, such that the car front lamps are off whenever the photoresistance catches light; a relay in the control system is excited and the car front lamps are automatically turned on when the photoresistance does not catch light in the night.

A further object of the present invention is to let the circuit system of the present invention be automatically broken off whenever car lamp switches are turned on by manual operation.

An advanced object of the present invention is to exclusively arrange a photoresistance such that car lamps are not turned on whenever the photoresistance catches light and car lamps are turned on whenever the photoresistance does not catch light, and to adapt the car for special driving condition such as in a tunnel without additional manual operation such that car lamps are automatically turned off after running ou of a tunnel and automatically turned on during night time driving and for a period of time after termination of driving, to thus help the driver see the area when leaving the car.

DETAILED DESCRIPTION

Figure 1:
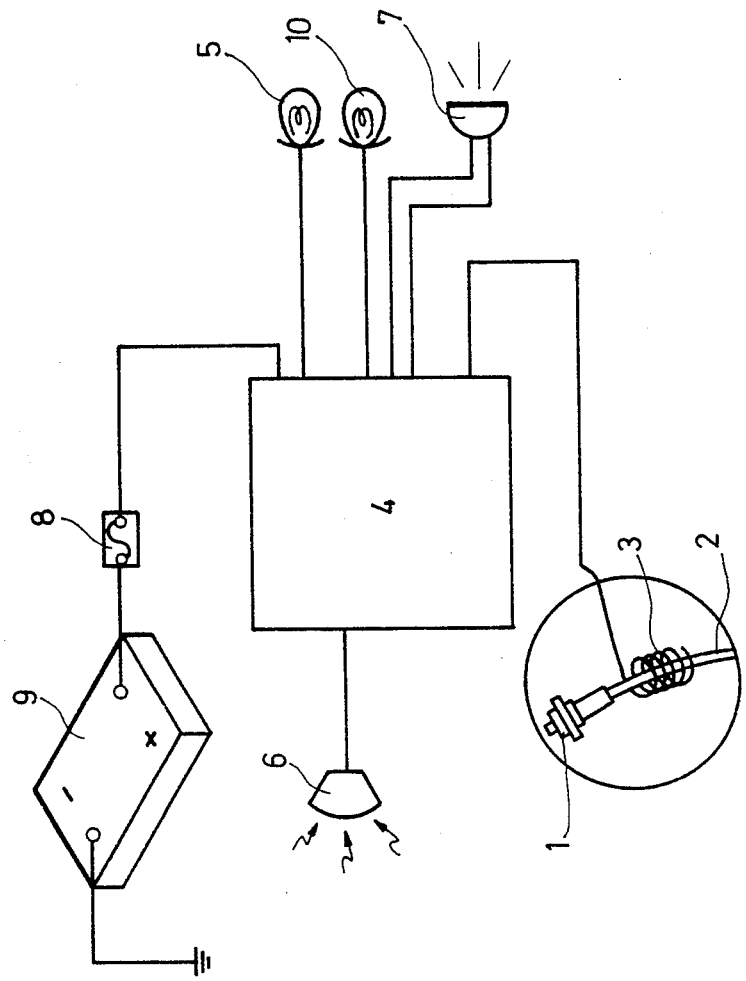
FIG. 1 is a block diagram of a preferred embodiment according to the present invention.

According to the block diagram as shown in FIG. 1, an induction coil 3 is arranged at the cable 2 of the car spark plug 1 to transmit an ignition signal to lamps lighting controller 4; The front and rear car location lamps 5 are turned on when the lamp lighting controller receives an ignition signal. Further, in the daytime, the photoresistance 6 (CDS detector) catches light, whereby the car front lamp 7 and the dash lamp 10 are turned off; in the night, the photo resistance 6 does not catch light, such that the lamp lighting controller 4 drives the car front lamp 7 and dash lamp 10 on. According to the present invention, the power is supplied through fuse 8 and battery 9.

Figure 2:
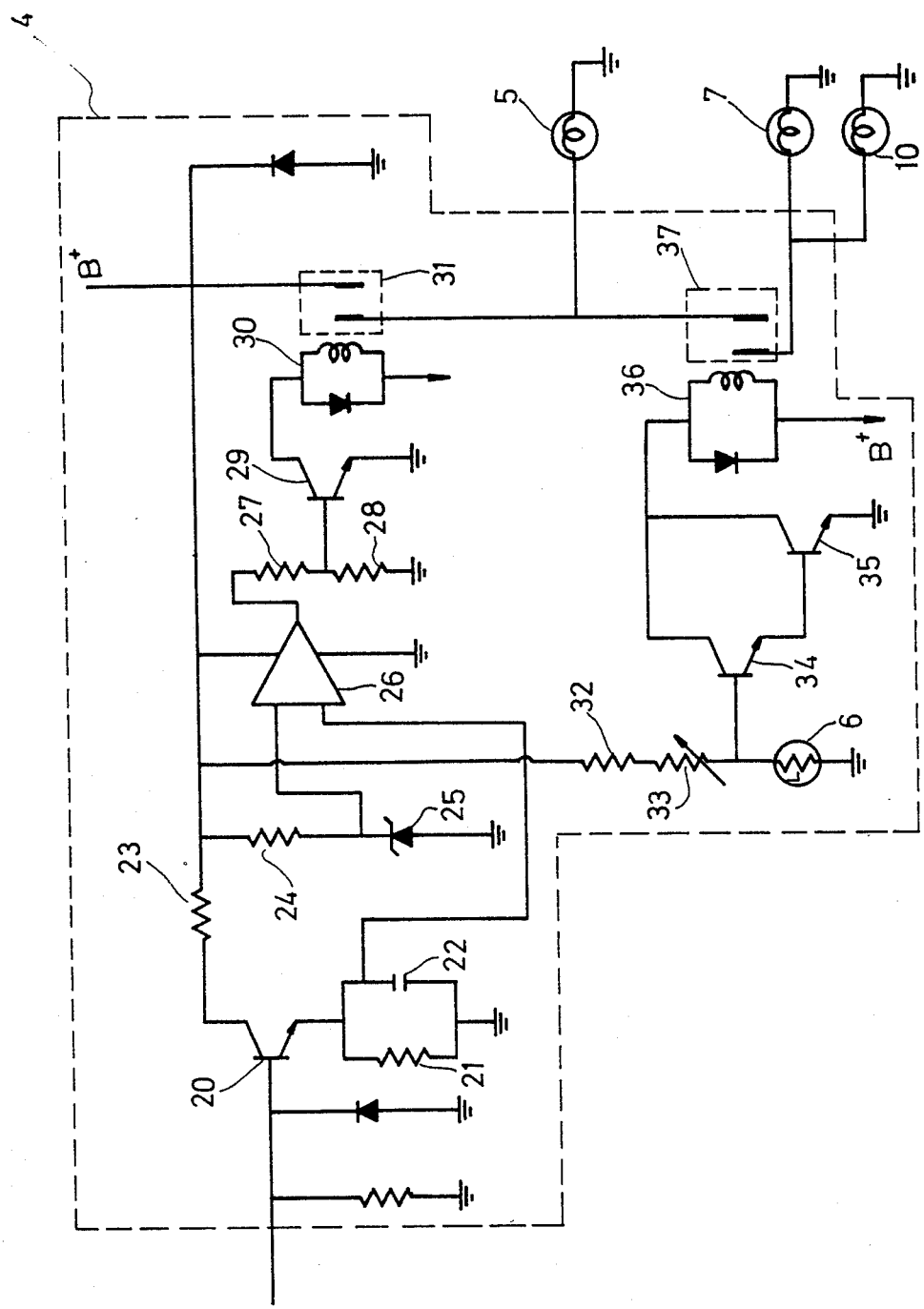
FIG. 2 is a control circuit diagram for the present invention.

According to the control circuit diagram as shown in FIG. 2, the signal from induction coil 3 runs to lamp lighting controller 4 to the base of the transistor 20, which signal is then amplified by the transistor 20 and transmitted to the positive input terminal of the comparator 26. The negative input terminal of the comparator 26 receives a reference potential from resistor 24 and Zener diode 25. When the car is started, the potential at the resistor 21 and the condenser 22 is lower than the potential at the junction between resistor 24 and the Zener diode 25, whereby the front and rear car location lamps 5 are not turned on; a short period after starting, the potential at the resistor 21 and the condenser 22 becomes higher than the reference potential produced from the resistor 24 and the Zener diode 25, and the output terminal of the comparator 26 will provide a signal at the junction between resistors 27 and 28 to turn on the transistor 29. This action will excite the relay 30 to close the normally open contacts 31, such that the battery voltage B+ energizes the car location lamp 5.

The other control circuit of the present invention includes a transistor 34 that is connected to battery voltage B+ through resistor 32, variable resistor 33 and photoresistance 6 such that in the daytime, photoresistance 6 catches light, so that its resistance value is decreasing to turn the transistor off; in the night, photoresistance 6 does not catch light and its resistance value is increasing; therefore, its bias voltage drives the transistor 34 and the transistor 35 on to cause the relay 36 to be excited. The normally open set of contacts 37 is thus closed, and the battery voltage B+ runs through contacts 31 and 37 to energize front lamp 7 and dash lamp 10.

With respect to the car battery power supply, it will be noted that the car engine consumes a maximum rating at the time it is started. Therefore, a delay circuit is arranged, according to the present invention, to defer lamp lighting so as to avoid concomitant operation with starting of the car engine. The delay circuit is comprised of a resistor 23, a transistor 20 and a condenser 22. Further, by means of the effect of delayed discharge from the condenser 22 and the resistor 21 the lamp system will remain energized for a period of time after the engine is stopped (deenergized).

When the car lamp switch (not shown) is turned by manual operation to the position for head-lamp or combination lamps, the present invention breaks off automatically to stop functioning. The present invention works only when the manual car lamp switch is turned to "Off" position.

Figure 3:
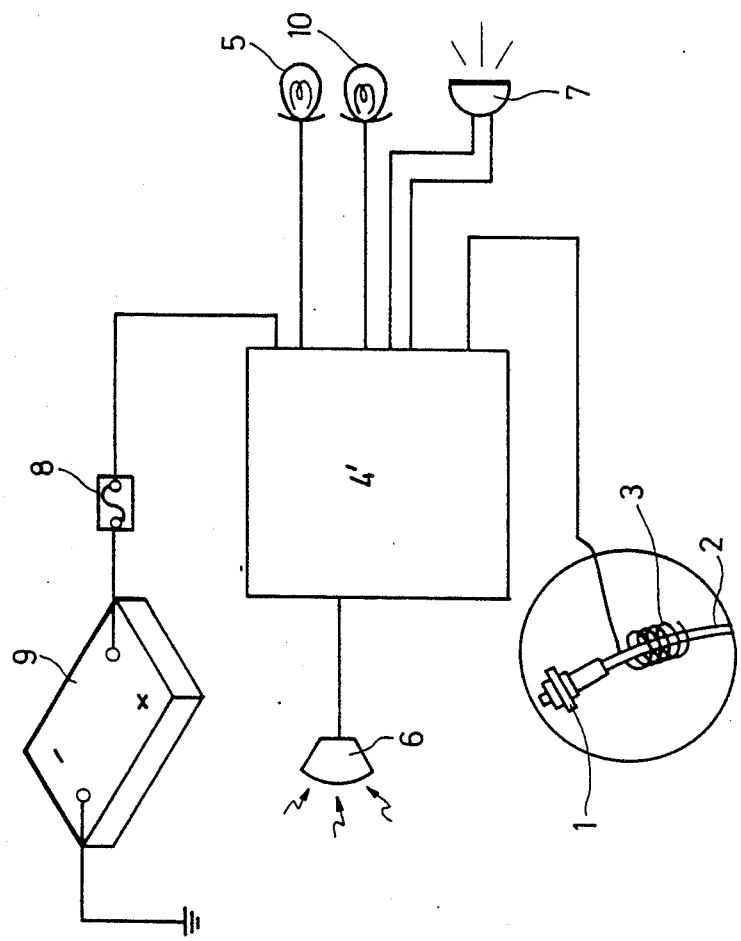
FIG. 3 is a block diagram of the other preferred embodiment according to the present invention.

Please refer to the other block diagram for another preferred embodiment according to the present invention (FIGS. 3 and 4) wherein the present invention has a structure similar to that above described with only a minor modification to match with different traffic regulations. When a car engine is ignited, the battery 9 turns on to the lamp lighting controller 4. During daytime hours the photoresistance 6 catches light, so that the relay 36 is not excited; during the night, the photoresistance 6 does not catch light, the relay 36 is excited, and the set of contacts 37 is automatically closed to let the front and the rear car location lamps 5 and the car front lamps 7 be turned on.

Figure 4:
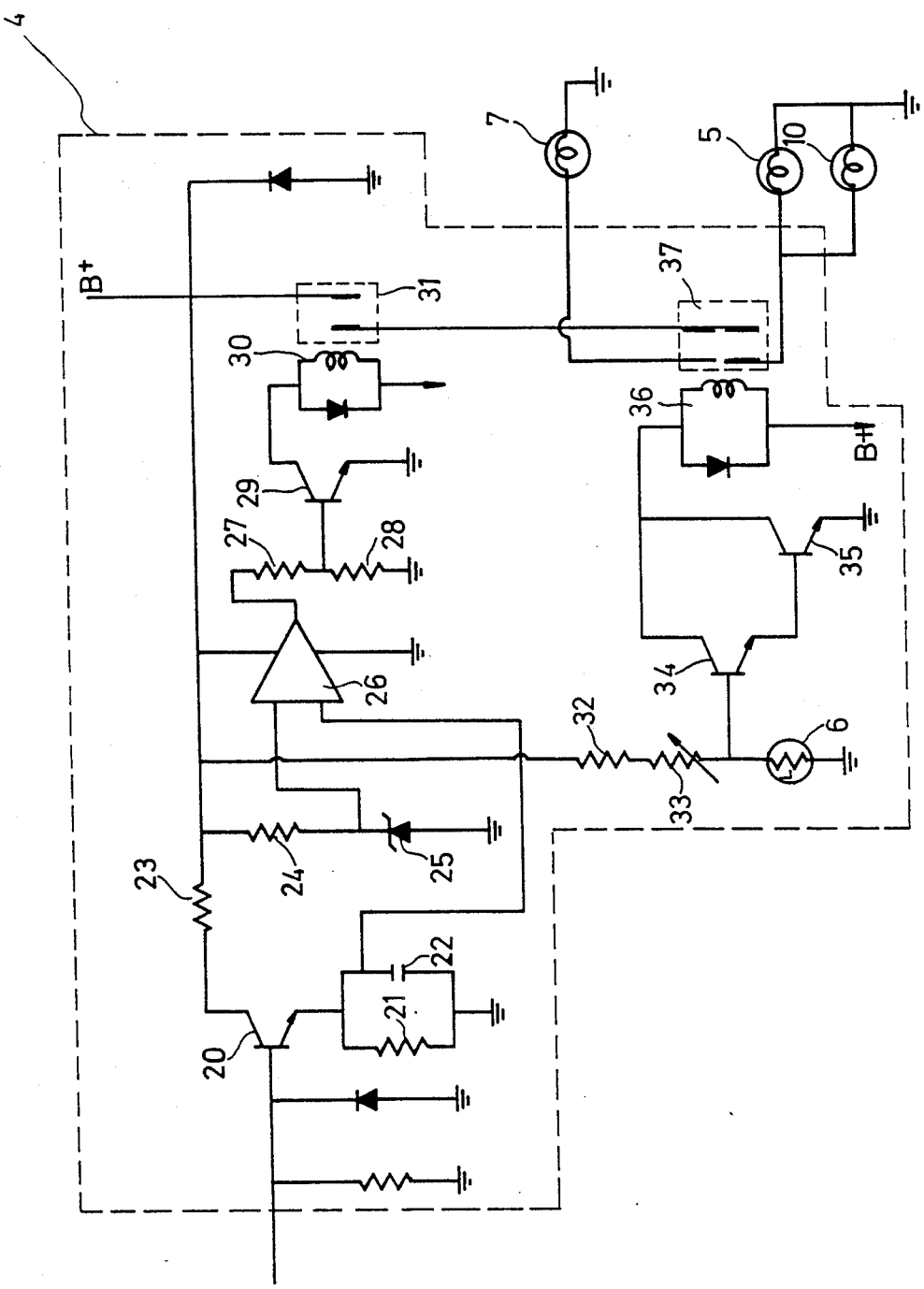
FIG. 4 is a control circuit diagram for the other preferred embodiment according to the present invention.

According to the other circuit diagram for the other preferred embodiment according to the present invention as shown in FIG. 4, the circuit is generally similar to the circuit indicated in FIG. 2 except that contacts 37 must be closed before any of the lamps 5, 7 or 10 are energized. In this circuit diagram, the ignition signal sensed by the induction coil 3 causes the relay 30 to be excited to close contacts 31. When photoresistance 6 catches light, the relay 36 is not excited; when photoresistance 6 does not catch light, the relay 36 is then excited and the front and the rear car location lamps 5, the car front lamp 7 and the dash lamp 10 are automatically turned on. When manual car lamp switch (not shown) is turned to the position for energizing the head-lamps or combination lamps, the present invention breaks off automatically to stop functioning.

Generally, the present invention is mainly characterized in that when a car is started and its spark plug is ignited, the induction coil 3 senses the ignition signal, such that the relay 30 is then excited, and the battery voltage B+ supplies current to the contacts 31. The other circuit is controlled by a photoresistance 6. In the night, the photoresistance 6 does not catch light, such that the relay 36 is excited, the contacts 37 are closed, and the front and the rear car location lamps 5, the car front lamp 7 and the dash lamp 10 are turned on. According to the present invention, all the controls are controlled by means of an engine ignition signal, such that the system can be designed to match with different traffic regulations to let the front and the rear car location lamps be automatically turned on after starting of the car and to let the car front lamps and car dash lamp be automatically turned on in the night; or the present invention can be designed to turn on after starting of the car, and the car location lamp, car front lamps, car dash lamp are automatically turned on in the night for ensuring a safe driving operation. As experimentation has proved, apparatus according to the present invention is indeed a practicable design.

I claim:

1. In a vehicle having a spark ignition engine and a lamp system: the improvement comprising means for automatically energizing lamps in the lamp system in response in operation of the engine and variations in ambient light conditions in the vicinity of the vehicle;

said energizing means comprising an induction coil (3) in close physical proximity to an engine spark plug wire to generate an electrical signal only when the engine is operating;

an amplifier means (20) connected to said induction coil to provide an amplified signal when the engine is operating;

a comparator (26) having two inputs;

means (at 24,25) for supplying a reference voltage to one of the comparator inputs;

circuit means for supplying said amplified signal to the other comparator input, whereby the comparator produces an output trigger signal only when the engine is operating;

a first relay (30) having a first set of contacts (31) for supplying current to the lamp system;

circuit means (at 29) for applying the trigger signal to the first relay for energizing same;

a second relay (36) having a second set of contacts (37) in circuit with said first set of contacts to control current flow to at least some of the lamps in the lamp system;

and a photoresistance means (6) responsive to external ambient light conditions to control current flow through said second relay, whereby lamps in the lamp system are automatically turned on when the engine is operating and the ambient light level is below a predetermined value.

2. The improvement of claim 1, wherein the lamp system comprises vehicle location lamp means (5) and road illumination lamp means (7);

said first set of contacts being in continuous circuit with said vehicle location lamp means to energize same independently of the second set of contacts;

said second set of contacts being in continuous circuit with the road illumination lamp means to energize same only when the engine is operating and the ambient light level is below a predetermined value.

3. The improvement of claim 1, wherein the lamp system comprises vehicle location lamp means (5) and road illumination lamp means (7);

said first set of contacts and said second set of contacts being in continuous series circuit connection with the vehicle location lamp means and the road illumination lamp means, whereby both lamp means are energized when the engine is operating and the ambient light level is below a predetermined value.

* * * * *